United States Patent

Sato et al.

[11] Patent Number: 5,230,417
[45] Date of Patent: Jul. 27, 1993

[54] DISTRIBUTING TRANSPORTATION DEVICE

[75] Inventors: Atsushi Sato, Utsunomiya; Masao Naramoto, Tochigi, both of Japan

[73] Assignee: KAO Corporation, Tokyo, Japan

[21] Appl. No.: 919,609

[22] Filed: Jul. 24, 1992

[30] Foreign Application Priority Data

Jul. 26, 1991 [JP] Japan ............... 3-187542

[51] Int. Cl.$^5$ ............... B65G 47/22
[52] U.S. Cl. ............... 198/365; 198/440; 198/802
[58] Field of Search ............... 198/365, 372, 436, 440, 198/456, 802

[56] References Cited

U.S. PATENT DOCUMENTS

| | | | |
|---|---|---|---|
| 3,731,782 | 5/1973 | Del Rosso | 198/365 X |
| 3,780,850 | 12/1973 | McSwiggin | 198/802 |
| 3,987,888 | 10/1976 | Wickam | 198/365 X |
| 4,223,777 | 9/1980 | Aykut | 198/365 |
| 4,984,675 | 1/1991 | Yamabe et al. | 198/365 |
| 5,027,939 | 7/1991 | Kilper et al. | 198/365 |

Primary Examiner—Robert P. Olszewski
Assistant Examiner—James R. Bidwell
Attorney, Agent, or Firm—Nils H. Ljungman & Associates

[57] ABSTRACT

The present invention relates to a distributing transportation device for distributing work fed in a single line into a plurality of lines. A plurality of carrier bars are driven in a form of a conveyer between a pair of chains traveling in synchronism with each other. Carrier plates are slidably supported on the carrier bars for a sliding movement in the axial direction of the carriers bars. A plurality of mutually adjacent carrier plates are connected by a connecting member having a flexibility but being rigid in the sliding direction of the carrier plate. A guide pin is projected from only one of the carrier plates grouped by such a connection. The guide pin is guided by distributing guide rails.

20 Claims, 5 Drawing Sheets

DISTRIBUTING TRANSPORTATION DEVICE

BACKGROUND OF THE INVENTION

1. Field of the Invention

The present invention relates to a distributing transportation device feeding out work flowing from a single line into a plurality of lines.

2. Description of the Related Art

Conventionally, in the manufacturing process of a 3.5 inch (90 mm) floppy disc cartridge, for example, half shells (half of casing with a liner) fed through a single upstream side transporting path into a plurality of downstream side transporting paths are distributed by a distributing transporting system, during a transportation thereof.

Such distributing transportation systems are provided at predetermined intervals along a chain travel path between a pair of left and right chains traveling in synchronism with each other. Each distributing transportation system includes a plurality of carrier bars extending substantially perpendicular to the chain travel direction and supported on the chains, and on each two carrier bars, one carrier plate is mounted so as to be freely slidable in the axial direction of the carrier bars. A guide pin is extended downwardly from the carrier plate. The guide pin cooperates with a distributing guide rail for guiding the guide pins for distribution.

Accordingly, when the guide pin of the carrier plate is guided to the distributing guide rail arranged at an oblique angle to the chain travel direction, the carrier plate is shifted in the axial direction of the carrier bars, and thus is shifted in the direction perpendicular to the travel direction of the chain during travel in the chain travel direction together with the carrier bars. Namely, the carrier plate travels at an oblique angle. Therefore, the work transported through the upstream side transporting path can be mounted over a plurality of carrier plates to be transported at an oblique angle, and thus be distributed into the left and right lines.

In such a conventional distributing transportation device, however, since the carrier plates guided by the distributing guide rail are transversely shifted on a one-by-one basis, when the work is mounted over a plurality of carrier plates, the positioning of the work can become an oblique angle due to a relative displacement between the carrier plates, and this oblique angular positioning of the work may become a cause of jamming, etc., when transferred to the downstream side transporting path.

It should be noted that such a problem would not arise if the work could be mounted on a single carrier plate, but the size of the carrier plate is limited, to allow a smooth reversal at the turning ends in the chain travel direction.

SUMMARY OF THE INVENTION

Therefore, an object of the present invention is to provide a distributing transportation device which can maintain the orientation of a work once mounted on the carrier plate and can distribute the same while maintaining the orientation thereof.

Another object of the invention is to provide a distributing transportation device which can ensure smooth motions of respective carrier plates upon a reversal thereof at the arc portions of the ends in a chain travel direction.

To accomplish the above-mentioned object, a distributing transportation device for distributing work fed therein in a single line into a plurality of lines, comprises a plurality of carrier bars provided between a pair of left and right chains traveling in synchronism with each other, at a given interval in a travel direction, the carrier bars extending in perpendicular direction relative to the chain travel direction and held on the chains at both ends, a plurality of carrier plates slidably supported on the carrier bars for a sliding movement in the direction of the axes of the carrier bars, a connecting member connecting a given number of mutually adjacent carrier plates, the connecting member having a flexibility but being rigid in the sliding direction of the carrier plates, a guide pin extending from only one of a plurality of carrier plates, which are interconnected by the connecting member, and distributing guide rails from guiding the guide pin.

In the above-mentioned construction, by transporting the work on a plurality of carrier plates, which are grouped by interconnection by a connecting member such as a plate form belt, the guide pin on one of the carrier plates in the group is guided by the distributing guide rail to cause one of the carrier plates to be shifted in the transverse direction along the axis of the carrier bars. Then, since all of a plurality of carrier plates in the same group are moved integrally in the sliding direction (direction of the axes of the carrier bars) by the connecting member, the relative displacement between the carrier plates in the same group will not occur. This allows a transportation while maintaining a constant orientation of the work.

When the travel direction of the carrier plates is reversed at the arc portion at the ends of the chain traveling direction, since the connecting member is flexible in the corresponding direction, a reversal of each carrier plate will not occur.

Note, the sliding grooves can be formed at front and rear end portions of the carrier plate in the travel direction, to be slidably engaged with the carrier bars, in the axial and circumferential direction of the carrier bars, so that one carrier plate is supported by a pair of carrier bars.

On the other hand, a part of the connecting member can be fixed to one of the carrier plates connected by the connecting member, and the connecting member engaged with a remaining carrier plates, to be slidably connected to the carrier plate in the chain travel direction.

As set forth above, by engaging the connecting member, which is fixed to one of the carrier plates in the group, to other carrier plates in a condition permitting an aligning thereof in the chain travel direction, a variation of the distance between the carrier plates upon reversal at the arc portions at the ends of the chain travel direction can be successfully accommodated, as other carrier plates are slidable relative to the connecting member in the chain travel direction. This contributes to a smooth action of the carrier plates upon reversal.

In addition, in a practical embodiment, the connecting member can be formed by a plate form belt having a sufficient flexibility in the bending direction and a sufficient rigidity in the shearing direction.

The feature and construction and effect and advantages achieved therewith will become made clear by the description given in terms of the preferred embodiment.

DESCRIPTION OF THE PREFERRED EMBODIMENT

Figure 7:
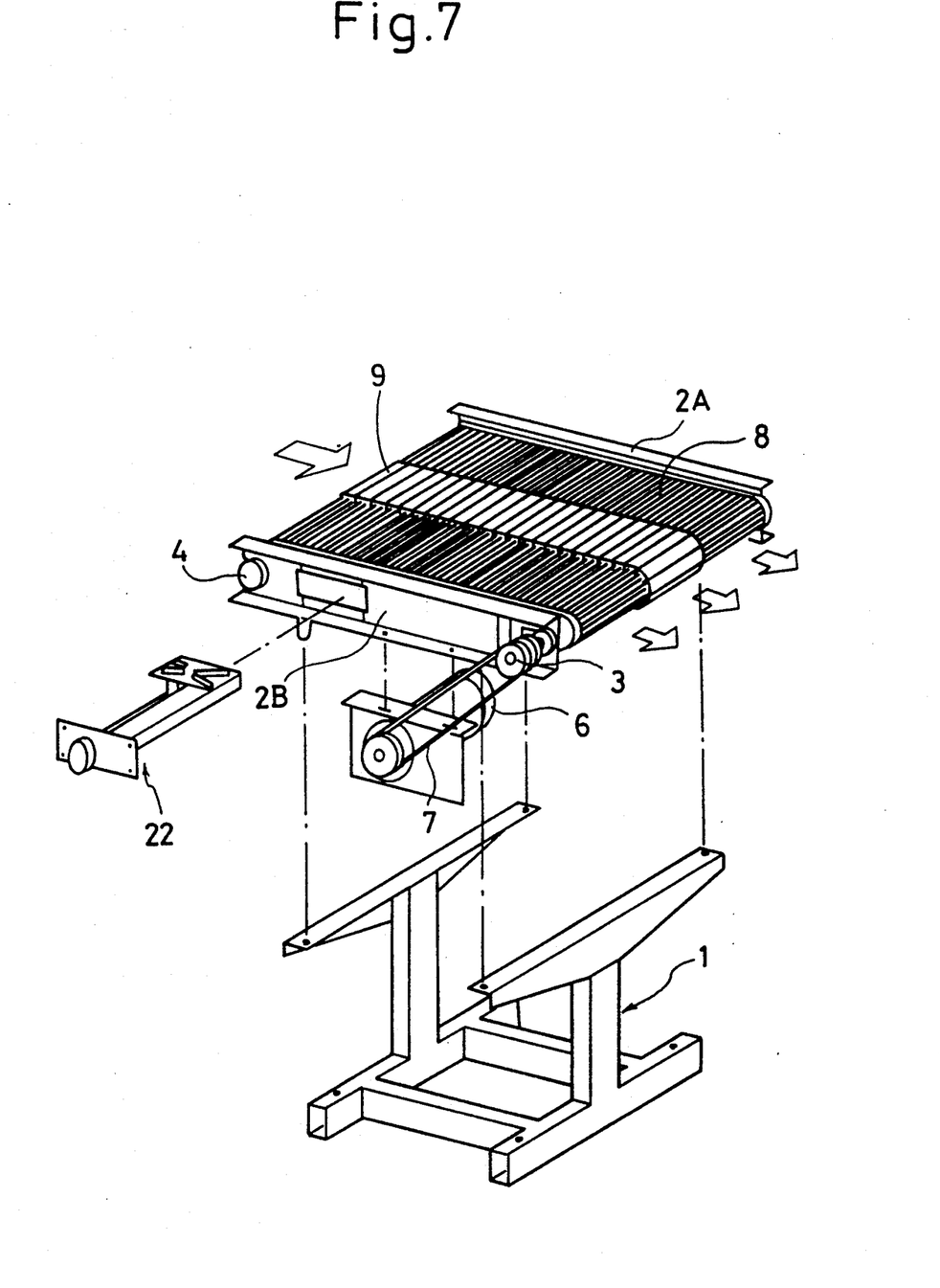
FIG. 7 is a perspective view showing an overall construction.
Figure 8:
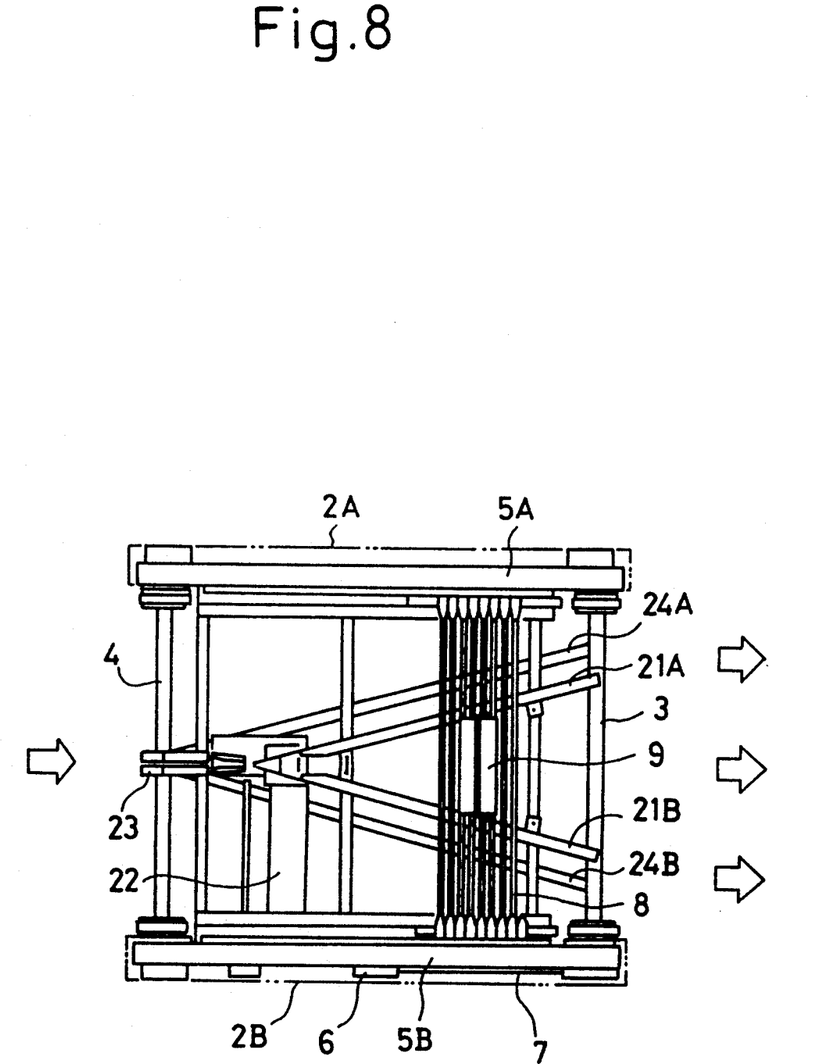
FIG. 8 is a plan view showing the overall construction.

Referring to FIGS. 7 and 8, left and right frames 2A and 2B are provided with legs 1, a drive shaft 3 and a driven shaft 4 are rotatable supported between the left and right frames 2A and 2B, chains 5A and 5B are extended around sprockets fixed on both ends of the drive shaft 3 and sprockets fixed on both ends of the driven shaft 4, and a motor 6 is connected to the drive shaft 3 via a transmission belt 7 for rotatingly driving the latter, and thus drives a pair of the left and right chains 5A and 5B in synchronism with each other.

A plurality of carrier bars 8 are provided on the pair of the left and right chains 5A and 5B, and the respective carrier bars 8 are extended in the direction perpendicular to a travel direction of the chains. Both axial ends of the carrier bars 8 are supported on the chains 5A and 5B to form a conveyer.

Carrier plates 9 are mounted on respective pairs of the carrier bars 8 in such a manner that each carrier plate 9 is freely slidable in the axial direction of the carrier bars 8.

A plurality of the carrier plates 9 (five in the shown embodiment) (9-1~9-5) mutually adjacent to each other are grouped as shown in FIGS. 1 to 4.

Figure 1:
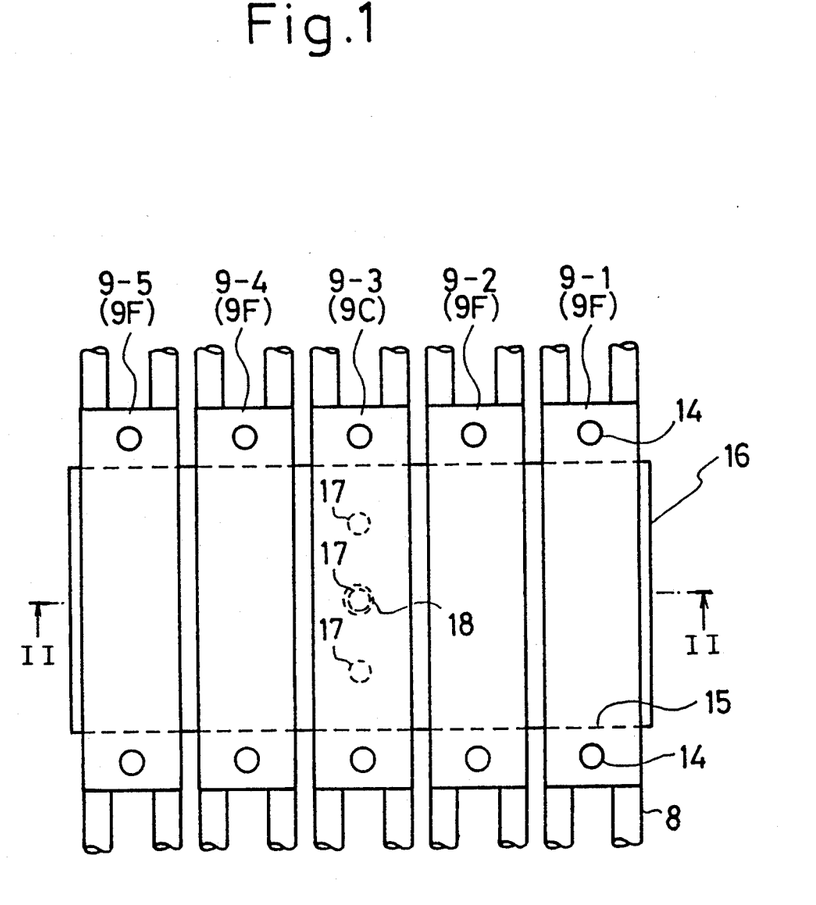
FIG. 1 is a plan view of a carrier plate group forming one embodiment of the present invention.
Figure 2:
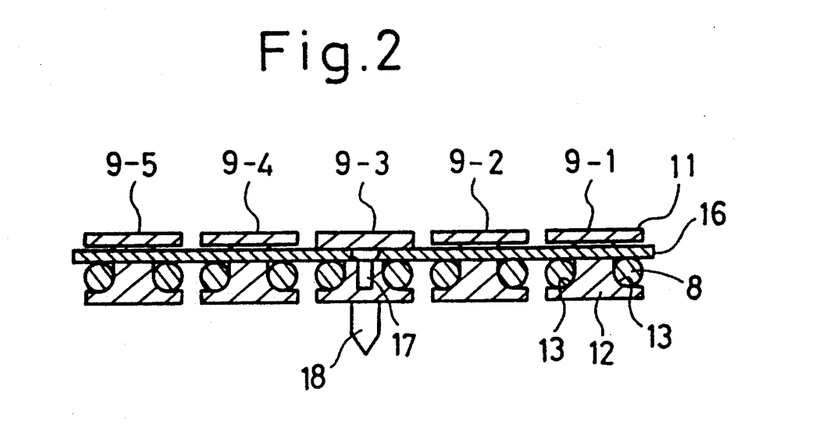
FIG. 2 is a section taken along a line A—A of FIG. 1.
Figure 3:
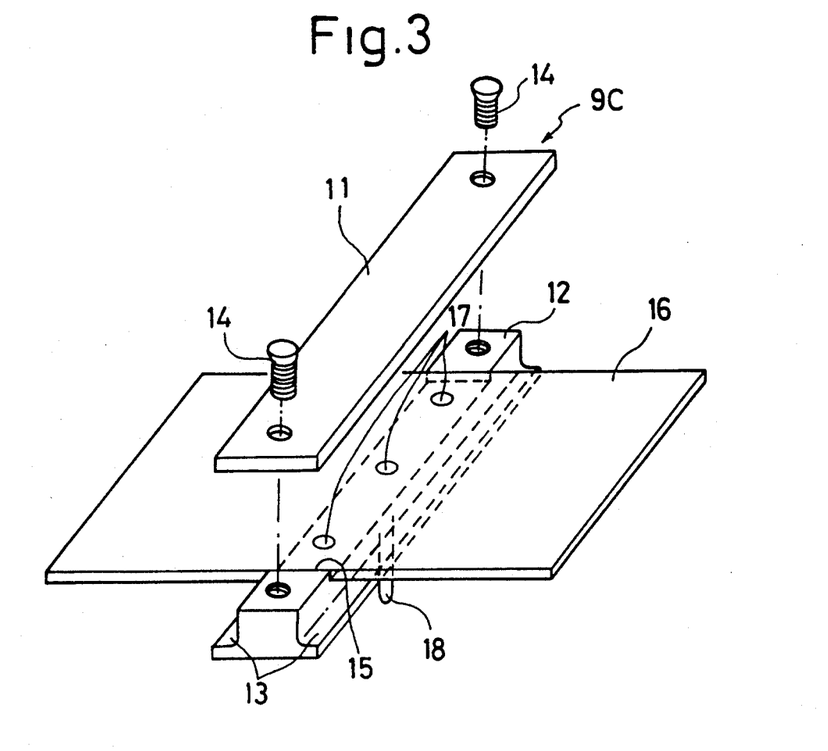
FIG. 3 is a perspective view of a center carrier plate.
Figure 4:
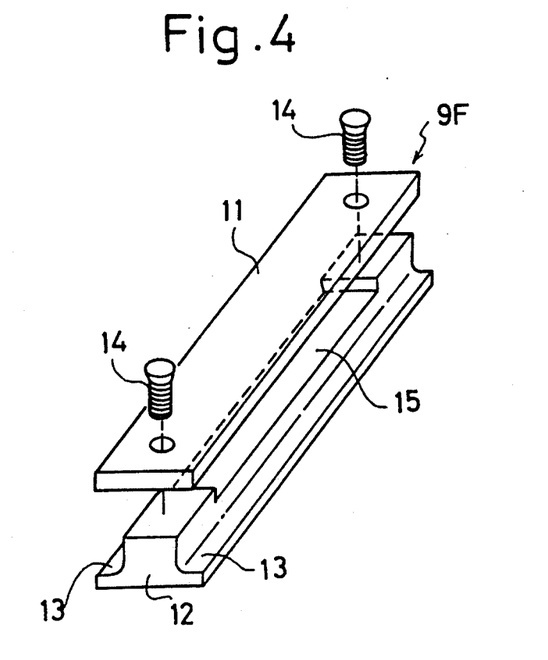
FIG. 4 is a perspective view of a free carrier plate.

Namely, each carrier plate 9 is formed with a plate form upper member 11 and a lower member 12 having sliding grooves 13 at front and rear ends thereof. The upper and lower members 11 and 12 are fixed to each other while disposing a pair of carrier bars 8 therebetween, by fastening screws. The carrier bars 8 are received in the sliding grooves 13, so as to slidably support the carrier plate 9 for sliding movement in the transverse direction relative to the chain travel direction. During assembly of the carrier plates as set forth above, the grouped carrier plates are connected to each other in a following manner, before tightening the fastening screws.

On the upper surfaces of the lower members 12 of the carrier plates 9, guide grooves 15 are formed at the transverse center thereof. The guide grooves 15 extend in the chain travel direction for the overall length of the lower members 12. The guide grooves 15 of the grouped five carrier plates 9-1 to 9-5 are aligned with each other. A plate form connecting belt 16 is received in the aligned guide grooves 15 of the carrier plates 9-1 to 9-5. The connecting belt (connecting member) 16 is fixed to the lower member 12 of a carrier plate 9-3, which is positioned at the intermediate position among five carrier plates 9-1 to 9-5 (which carrier plate 9-3 will be hereafter referred to as "center carrier plate 9C") by fastening screws 17 (see FIG. 3). The connecting belt 16 has a flexibility but is rigid in the sliding direction of the carrier plates 9. Accordingly, the five carrier plates 9-1 and 9-5 are integrated in terms of the transverse movement in the axial direction of the carrier bars 8 to shift in unison.

It should be noted that the connecting belt 16 is not fixed to other carrier plates 9-1, 9-2, 9-4 and 9-5 (hereafter referred to as "free carrier plates 9F"). Therefore, the connecting belt 16 is slidable in the chain travel direction relative to the guide grooves 15 of these carrier plates (see FIG. 4).

On the other hand, a guide pin 18 is extended from the lower surface of the lower member 12 only of the center carrier plate 9C.

As shown in FIG. 8, between the upper surface and the lower surface of the conveyer, and in the vicinity of the upper surface side, distributing guide rails 21A and 21B are provided for guiding the guide pin 18. Since the shown embodiment is directed for distribution in three ways, two guide rails 21A and 21B are arranged in an essentially V-shaped configuration branching in the vicinity of the inlet side and increasing the distance therebetween toward to outlet side. A point switching deck 22 is provided at the position upstream of the inlet side end of the distributing guide rails 21A and 21B for performing a switching of points, including a neutral position. When a motor is driven appropriately by a control device (not shown), the point switching deck 22 moves on a threaded rod rotated by the motor from the neutral position to the right/left switching position according to the preliminarily programmed distributing way.

An inlet side guide rail 23 is positioned at the transverse center at the inlet. Also, a pair of return guide rails 24A and 24B are provided in the vicinity of the lower surface of the conveyer directed to the transverse center toward the inlet side.

Next, the operation will be explained.

When the point switching deck 22 is set at the neutral position as shown in FIG. 8, the center carrier plate 9C as guided by the inlet side guide rail 23 travels straight without being guided by any of the distributing guide rails 21A and 21B across the point switching deck 22 after traveling away from the inlet side guide rail 23. Therefore, the carrier plates 9 as a group travel straight while being maintained at the transverse center of the carrier bars 8.

On the other hand, when a switching operation is performed for switching the point switching deck 22 toward one direction, the center carrier plate 9C as guided by the inlet side guide rail 23 is guided by the outer face of the distributing guide rail 21A via the point switching deck 22 after traveling away from the inlet side guide rail 23. In such a case, the center carrier plate 9C together with the free carrier plates 9F are guided toward the left in the axial direction of the carrier bars 8 while traveling in the chain travel direction together with the carrier bars 8. As a result, the carrier plate 9 travels at an oblique angle to the chain travel direction.

When a switching operation is performed for switching the point switching deck 22 toward the other direction, the center carrier plate 9 C, guided first by the inlet side guide rail 23, is guided by the outer face of the distributing guide rail 21B via the point switching deck 22 after traveling away from the inlet side guide rail 23. In such a case, the center carrier plate 9C together with the free carrier plates 9F are guided toward the right in the axial direction of the carrier bars 8 while traveling in the chain travel direction together with the carrier bars 8. As a result, the carrier plate 9 travels at an oblique angle to the chain travel direction.

As set forth above, even when the guide pin 18 of the center carrier plate 9C is guided by the distributing guide rails 21A and 21B to be shifted transversely in the direction of the axes of the carrier bars 8, other free carrier plates 9F in the same group are integrally shifted in the transverse direction.

Figure 5:
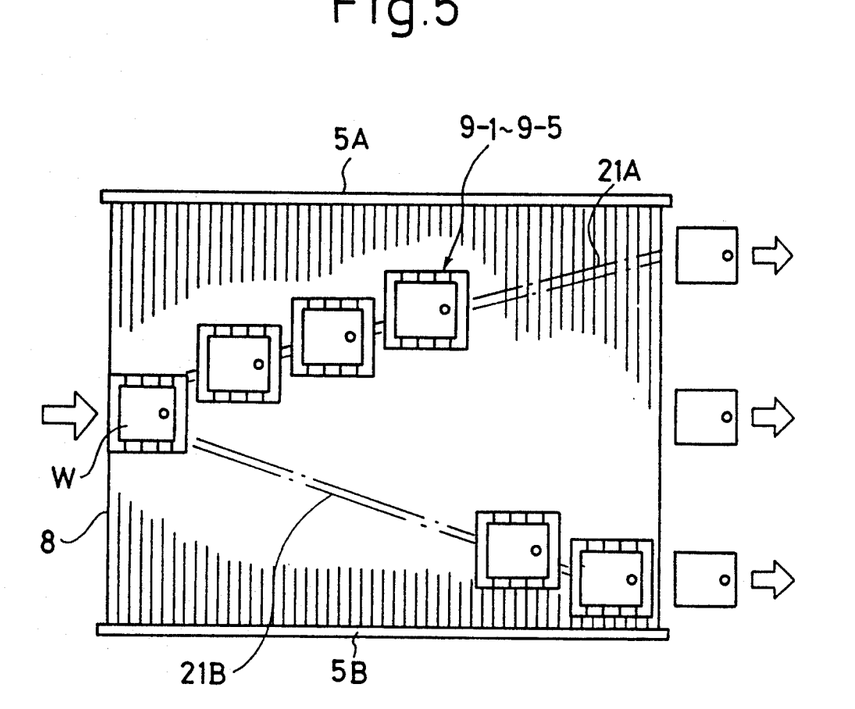
FIG. 5 is a plan view showing flow of the work.

Therefore, as shown in FIG. 5, each group of five carrier plates 9-1 to 9-5 can be shifted in unison and will not cause a relative displacement of the carrier plates in the same group.

Accordingly, by mounting the work W transported from the upstream side transporting line on the grouped five carrier plates 9-1 to 9-5 while adjusting the timing, the work W can be distributed straight, to the left or to the right while maintaining the position thereof. Therefore, the work W can be transferred to the central, left and right downstream transporting lines while correctly positioned.

Figure 6:
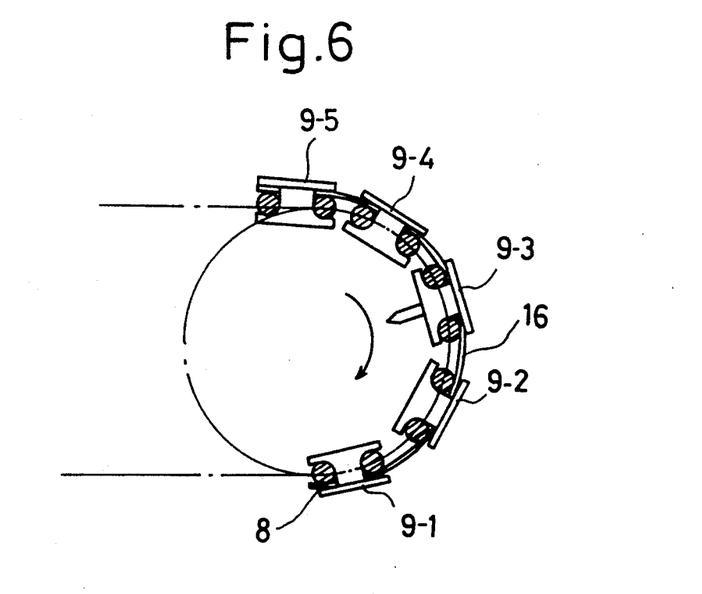
FIG. 6 is a side elevation showing an action at the arc portion at the ends in the chain travel directions.

Here, as shown in FIG. 6, when the direction of travel of the group of five carrier plates 9-1 to 9-5 is reversed at the arc portion at the ends of the chain traveling direction, since the connecting belt 16 is flexible in the chain travel direction, a reversal of the carrier plates 9-1 to 9-5 will not occur.

On the other hand, at this time, since the connecting belt 16 is fixed only to the center carrier plate 9C, and is not fixed to any of the free carrier plate 9F, and thus is slidable in the chain travel direction relative thereto, it can accommodate any variation of the distance between the carrier plates 9-1 to 9-5, to ensure a smooth reversal thereof.

It should be noted that, although the shown embodiment forms a group of five carrier plates, the number of carrier plates to be grouped should be appropriately determined depending upon the application and configuration of the work to be distributed and transported.

On the other hand, the guide pin 18 need not be provided on the center carrier plate 9C but can be provided on any of the free carrier plates 9F. Also, the connecting belt 16 need not be fixed to the center carrier plate 9C but can be fixed to any of the free carrier plates 9F. Namely, it is essential only that at least one guide pin is provide for the grouped carrier plates and the connecting belt is fixed to one of the grouped carrier plates.

As set forth above, according to the present invention, by transporting the work while mounting the same on a plurality of the carrier plates grouped by being connected to each other by the connecting member, a relative displacement of the carrier plates within the group will not occur. Therefore, a constant orientation of the work to be distributed and transported can be maintained. As a result, problems, such as jamming, in the subsequent process can be successfully avoided.

In addition, when the travel direction of the grouped carrier plates is reversed at the arc portion at the ends of the chain travel direction, the reversal of each individual carrier plate can not occur and thus the action remains smooth.

What is claimed is:

1. A distributing transportation device for distributing work fed thereinto in a single line into a plurality of lines, comprising:
a plurality of carrier bars provided between a pair of left and right chains traveling in synchronism with each other, at given intervals in a traveling direction, said carrier bars extending in a perpendicular direction relative to the chain travel direction and held on said chains at both ends;
a plurality of carrier plates slidably supported on said carrier bars for a sliding movement in a direction of the axes of said carrier bars;
a connecting member connecting a given number of mutually adjacent carrier plates, said connecting member having a flexibility but being rigid in the sliding direction of said carrier plates;
a guide pin extending from only one of a plurality of carrier plates interconnected by said connecting member; and
distributing guide rails for guiding said guide pin.

2. A distributing transportation device as set forth in claim 1, wherein sliding grooves are formed at front and rear end portions of said carrier plate in the travel direction, which slidably engage said carrier bars in the axial and circumferential direction of said carrier bars, so that one carrier plate is supported by a pair of carrier bars.

3. A distributing transportation device as set forth in claim 1, wherein a part of said connecting member is fixed to one of said carrier plates connected by said connecting member, and said connecting member is engaged to remaining carrier plates to be slidably connected together with said one of said carrier plates in the chain travel direction.

4. A distributing transportation device as set forth in claim 1, wherein said connecting member is a plate form belt.

5. A distribution device for distributing articles from an inlet line into at least one outlet line, said distribution device comprising:
a conveyor movable along a predetermined path between the inlet line and the at least one outlet line;
a plurality of carrier plates for carrying the articles from the inlet line to the outlet line;
means for supporting said plurality of carrier plates on said conveyor, said means for supporting being configured for permitting movement of said plurality of carrier plates on said conveyor in a direction transverse to said predetermined path;
said carrier plates being spaced apart from one another in a direction of said predetermined path;
means for connecting together at least two adjacent carrier plates to form a carrier unit of said at least two adjacent carrier plates, said means for connecting being configured for providing simultaneous movement of said at least two connected carrier plates as a unit in a direction transverse to said predetermined path;
guide rail means for guiding said simultaneous movement of said at least two connected carrier plates in a direction transverse to said predetermined path; and
at least one of said at least two connected carrier plates comprising means for engaging said guide rail means to simultaneously move said at least two connected carrier plates as a unit in a direction transverse to said predetermined path during movement of said conveyor along said predetermined path.

6. The distribution device according to claim 5, wherein the inlet line comprises a single inlet line and the at least one outlet line comprises a plurality of outlet lines, the plurality of outlet lines being disposed in a spaced apart relationship with respect to one another in a direction transverse to said predetermined path of travel of said conveyor.

7. The distribution device according to claim 6, wherein:
said conveyor comprises a plurality of spaced apart bars disposed transverse to said predetermined path of travel; and
each of said carrier plates comprises means for slidably supporting said carrier plate on a pair of adjacent ones of said spaced apart bars, said means for slidably supporting being configured to permit movement of said carrier plates along said spaced apart bars in a direction transverse to said predetermined path of travel.

8. The distribution device according to claim 7, wherein said means for connecting at least two adjacent carrier plates is substantially rigid in said direction transverse to the predetermined path of travel for maintaining said simultaneous movement of said at least two connected carrier plates as a unit in said direction transverse to said predetermined path of travel.

9. The distribution device according to claim 8, wherein only one of said at least two connected carrier plates of a carrier unit comprises said means for engaging said guide rail means.

10. The distribution device according to claim 9, wherein:
said distribution device further comprises at least first and second shaft means spaced apart from one another;
said conveyor comprises an endless conveyor disposed about said at least first and second shaft means; and
said conveyor and said means for connecting being flexible to bend about said at least first and second shaft means during movement of said conveyor and said carrier plates about said at least first and second shaft means.

11. The distribution device according to claim 10, wherein:
each of said carrier plates comprises first slot means for receipt of said means for connecting;
each of said carrier plates comprise means for fastening said means for connecting within said first slot means of one of said at least two connected carrier plates; and
said slot means of others of said at least two connected carrier plates of a carrier unit being configured for permitting sliding of said means for connecting within said slot means in a direction along said predetermined path of travel.

12. The distribution device according to claim 11, wherein:
each of said carrier plates have a forward edge disposed in a direction of travel of said carrier plates and a rearward edge disposed opposite said forward edge; and
each of said carrier plates further comprise second slot means at said forward and rearward edges of said carrier plates, said second slot means being configured for receiving one each of said pair of conveyor bars therein to permit sliding of said carrier plates along said pair of conveyor bars in said direction transverse to said predetermined path of travel.

13. The distribution device according to claim 12, wherein:
each of said plurality of carrier plates comprises first and second plate segments, said first plate segment for being disposed on a first side of said conveyor bars, and said second plate segment for being disposed on a second side of said conveyor bars;
said second plate segment comprising a first surface for being disposed towards said first plate segment, said first surface being notched for forming said first slot means;
said first slot means being disposed between said first and second plate segments;
said second plate segments comprising notched forward and rearward edges for forming said second slot means; and
each of said carrier plates comprises means for fastening said first plate segment to said second plate segment.

14. The distribution device according to claim 13, wherein:
each of said conveyor bars has first and second ends;
said conveyor bars being disposed in alignment with one another such that said first and second ends of said conveyor bars define first and second sides of said conveyor; and
said distribution device further includes:
chains disposed about said first and second sides of said conveyor, said first and second ends of said conveyor rods being fastened to said chains;
sprockets disposed on ends of said first and second shaft means, said chains being disposed about said sprockets;
drive means for driving one of said first and second shaft means to move said conveyor along said predetermined path of travel;
additional guide rail means for returning said carrier units to the inlet line; and
switching means for directing said carrier units towards one of the plurality of outlet lines.

15. The distribution device according to claim 5, wherein said at least two connected carrier plates of a carrier unit are aligned with one another in a direction along said predetermined path of travel during said simultaneous movement, said means for connecting being configured for maintaining said alignment of said at least two connected carrier plates of a carrier unit during movement of said carrier unit from the inlet line to the at least one outlet line.

16. The distribution device according to claim 15, wherein:
said means for connecting at least two adjacent carrier plates is substantially rigid in said direction transverse to said predetermined path of travel for maintaining said simultaneous movement of said at least two connected carrier plates as a unit in said direction transverse to said predetermined path of travel; and
only one of said at least two connected carrier plates of a carrier unit comprises said means for engaging said guide rail means.

17. The distribution device according to claim 16, wherein:
said conveyor comprises a plurality of spaced apart bars disposed transverse to said predetermined path of travel; and
each of said carrier plates comprises means for slidably supporting said carrier plates on a pair of adjacent ones of said spaced apart bars, said means for slidably supporting being configured to permit movement of said carrier plates along said spaced apart bars in a direction transverse to said predetermined path of travel.

18. The distribution device according to claim 17, wherein:
    said distribution device further comprises at least first and second shaft means spaced apart from one another;
    said conveyor comprises an endless conveyor disposed about said at least first and second shaft means; and
    said conveyor and said means for connecting being flexible to bend about said at least first and second shaft means during movement of said conveyor and said carrier plates about said at least first and second shaft means.

19. The distribution device according to claim 18, wherein:
    each of said carrier plates comprise first slot means for receipt of said means for connecting;
    each of said carrier plates comprise means for fastening said means for connecting within said first slot means of one of said at least two connected carrier plates; and
    said slot means of others of said at least two connected carrier plates of a carrier unit being configured for permitting sliding of said means for connecting within said slot means in a direction along said predetermined path of travel.

20. The distribution device according to claim 19, wherein:
    the inlet line comprises a single inlet line and the at least one outlet line comprises a plurality of outlet lines, the plurality of outlet lines being disposed spaced apart in a direction transverse to said predetermined path of travel of said conveyor;
    each of said carrier plates have a forward edge disposed in a direction of travel of said carrier plates and a rearward edge disposed opposite said forward edge;
    each of said carrier plates further comprise second slot means at said forward and rearward edges of said carrier plates, said second slot means being configured for receiving one each of said pair of conveyor bars therein to permit sliding of said carrier plates along said pair of conveyor bars in said direction transverse to said predetermined path of travel;
    each of said plurality of carrier plates comprises first and second plate segments, said first plate segment for being disposed on a first side of said conveyor bars, and said second plate segment for being disposed on a second side of said conveyor bars;
    said second plate segment comprising a first surface for being disposed towards said first plate segment, said first surface being notched for forming said first slot means;
    said first slot means being disposed between said first and second plate segments;
    said second plate segments comprising notched forward and rearward edges for forming said second slot means;
    each of said carrier plates comprises means for fastening said first plate segment to said second plate segment.
    each of said conveyor bars has first and second ends;
    said conveyor bars being disposed in alignment with one another such that said first and second ends of said conveyor bars define first and second sides of said conveyor; and
    said distribution device further includes:
    chains disposed about said first and second sides of said conveyor, said first and second ends of said conveyor rods being fastened to said chains;
    sprockets disposed on ends of said first and second shaft means, said chains being disposed about said sprockets;
    drive means for driving one of said first and second shaft means to move said conveyor along said predetermined path of travel;
    additional guide rail means for returning said carrier units to the inlet line; and
    distribution switching means for directing said carrier units towards one of the plurality of outlet lines.

* * * * *